United States Patent
Pyles et al.

(10) Patent No.: US 6,994,735 B2
(45) Date of Patent: Feb. 7, 2006

(54) PROCESS FOR TINTING PLASTIC ARTICLES

(75) Inventors: Robert A. Pyles, Bethel Park, PA (US); David M. Derikart, Tarentum, PA (US); Rick L. Archey, Pleasant Hills, PA (US); Michael Nikolakopoulos, Pittsburgh, PA (US)

(73) Assignee: Bayer Materialscience LLC, Pittsburgh, PA (US)

( * ) Notice: Subject to any disclaimer, the term of this patent is extended or adjusted under 35 U.S.C. 154(b) by 11 days.

(21) Appl. No.: 10/434,242

(22) Filed: May 8, 2003

(65) Prior Publication Data

US 2004/0221403 A1 Nov. 11, 2004

(51) Int. Cl.
*D06P 1/613* (2006.01)

(52) U.S. Cl. ................ 8/609; 8/506; 8/509; 8/510; 8/512; 8/513; 8/514; 8/515

(58) Field of Classification Search ............ 8/506–515, 8/609, 611
See application file for complete search history.

(56) References Cited

U.S. PATENT DOCUMENTS

| | | | |
|---|---|---|---|
| 2,128,533 A | | 8/1938 | Howald .................. 18/61 |
| 2,601,460 A | | 6/1952 | Salvin ...................... 8/4 |
| 3,514,246 A | * | 5/1970 | Bianco et al. .............. 8/506 |
| 3,532,454 A | * | 10/1970 | Fuhr et al. ................ 8/583 |
| 3,630,664 A | | 12/1971 | Nentwig et al. ............ 8/173 |
| 4,076,496 A | | 2/1978 | Hamano .................... 8/4 |
| 4,310,330 A | | 1/1982 | Funaki et al. ............. 8/506 |
| 4,812,142 A | | 3/1989 | Brodmann ................. 8/512 |
| 5,453,100 A | | 9/1995 | Sieloff .................... 8/479 |
| 5,560,751 A | * | 10/1996 | Hoshiyama ................ 8/506 |
| 6,464,733 B2 | | 10/2002 | Ryser ....................... 8/44 |
| 2002/0040511 A1 | | 4/2002 | Ryser ...................... 8/506 |

FOREIGN PATENT DOCUMENTS

| | | |
|---|---|---|
| JP | 53035831 | 9/1978 |
| JP | 55017156 | 5/1980 |
| JP | 56-31085 | 3/1981 |
| JP | 2000-248476 | 9/2000 |

OTHER PUBLICATIONS

Handook of Detergents, Chapter 2 Surfactants:Classification, edited by Guy Broze, 1999.*

* cited by examiner

Primary Examiner—Margaret Einsmann
(74) Attorney, Agent, or Firm—Joseph C. Gil; Aron Preis

(57) ABSTRACT

A process for tinting a molded article is disclosed. The process entails applying by spraying or by flow coating a hot, dye-solution onto at least a portion of the surface of a molded article to obtain a tinted article and washing the tinted article. In addition to the dissolved dye, the dye solution that is substantially free of particulate matter contains an aqueous solution of a carrier and an optional emulsifier. The article is one molded of a thermoplastic molding composition. In an embodiment of the invention, the dye solution is prepared by filtering a hot aqueous solution through a bag filter that contains a dye to obtain a hot, dye-solution. In a further embodiment, activated carbon is used to purify the dye solution to obtain a dye-free aqueous solution.

11 Claims, No Drawings

PROCESS FOR TINTING PLASTIC ARTICLES

FIELD OF THE INVENTION

The invention relates to a process for coloring and more particularly to tinting articles molded of a thermoplastic material.

SUMMARY OF THE INVENTION

A process for tinting a molded article is disclosed. The process entails applying by spraying or by flow coating a hot, dye-solution onto at least a portion of the surface of a molded article to obtain a tinted article and washing the tinted article. In addition to the dissolved dye, the dye solution that is substantially free of particulate matter contains an aqueous solution a carrier and an emulsifier. The article is one molded of a thermoplastic molding composition. In an embodiment of the invention, the dye solution is prepared by circulating a hot aqueous solution through a bag filter that contains a dye to obtain a hot, dye-solution. In a further embodiment, activated carbon is used to purify the dye solution to obtain a dye-free aqueous solution.

TECHNICAL BACKGROUND OF THE INVENTION

Articles molded of thermoplastic molding compositions, including colored, pigmented and tinted compositions are well known. Also known are processes for dyeing articles by immersion in special pigmenting mixtures. Among the advantages attained by such tinting, especially of lenses, mention has been made of reduced light transmission and mitigation of glare.

U.S. Pat. No. 4,076,496 disclosed dipping an article in a dye bath that contains a dye and as a solvent, a mixture of glycerol and ethylene glycol, optionally with a minor proportion of water or other organic solvent.

U.S. Pat. No. 5,453,100 disclosed polycarbonate materials that are dyed by immersion into a mixture of dye or pigment dissolved in a solvent blend. The blend is made up of an impregnating solvent that attacks the polycarbonate and allows the impregnation of the dye or pigment and a moderating solvent that mitigates the attack of the impregnating solvent. The impregnating solvent thus disclosed includes at least one solvent selected from dipropylene glycol monomethyl ether, tripropylene glycol monomethyl ether and propylene glycol monomethyl ether.

PCT/CA99/00803 (WO 0014325) disclosed tinting plastic articles by immersion in an aqueous dispersion and exposing the dispersion and immersed article to microwave radiation.

JP 53035831 B4 disclosed polycarbonate moldings that are dyed in aqueous dispersion containing dispersed dyes and diallyl phthalate, o-phenylphenol or benzylalcohol.

JP 55017156 disclosed aliphatic polycarbonate lenses that are colored with a liquor containing dyes and water.

JP 56031085 (JP-104863) disclosed compositions containing a disperse dye in an aliphatic ketone and polyhydric alcohol said to be useful in coloring polycarbonate films at room temperature.

JP2000248476 disclosed a molded polycarbonate bolt that was dyed with a solution containing dyes, an anionic leveling agent and then treated with a solution containing thiourea dioxide.

U.S. Pat. No. 4,812,142 disclosed polycarbonate articles dyed at a temperature of 200° F. or above in a dye solvent having a boiling point of at least 350° F.

U.S. Pat. No. 3,514,246 disclosed immersing molded polycarbonate articles in an emulsified dye liquor which contains a water insoluble dyestuff, an oil-soluble surface active agent dissolved in an aliphatic hydrocarbon solvent and water. The procedure was repeated with similar results where the surfactant was replaced by a poly(oxyethylene) derivative.

U.S. Pat. No. 3,532,454 disclosed dyeing of polycarbonate fibers with a dye composition that contains at least one of alkoxyalkylbenzyl ether, alkylene glycol di-benzyl ether, benzoic acid alkoxyalkyl ester or phenoxy acetic acid-alkoxyalkyl ester.

U.S. Pat. No. 3,630,664 disclosed a dye bath that required the presence of a carbonate conforming to a specific formula, e.g., ethyl-benzyl-carbonate.

The art, therefore, includes a variety of techniques for tinting molded articles and all the presently relevant ones involve dipping of the article in a hot dye mixture under conditions to promote infusion of the dyes. Once tinted, the article is removed from the solution, rinsed and dried to produce articles ready for commerce.

Several problems may arise in connection with these practices, especially in the instances where large articles are to be colored. In these instances, there is often a need for large volumes of dye solution and the vessel into which the article needs to be dipped must be rigorously reinforced to support the great weight of the article and of the dyeing liquid. Also, the vessel must be equipped with heating means, pumping and ancillary equipment, including piping for circulating the dye solution. To heat hundreds of gallons of solvent to the required temperature, a very large heater is needed for a commercially reasonable operation. Additionally, for some shapes and for large articles, it is necessary to equip the dipping vessel with jets to promote vigorous circulation of the solution so as to achieve uniform tinting. Effective circulation is often difficult to achieve in rectangular-shaped tanks and the resulting tinting is not always uniform. Another problem associated with dipping of large articles for the purpose of tinting is the loss of components of the hot dye solution by evaporation. Finally, in practicing the dip-dye technology, the tinted article needs to be transferred from the dipping vessel to a different area to be water-rinsed and then to a drying step. Moving large articles often requires special equipment to enable transfer and is also wasteful in terms of time and space.

One object of the present invention is to provide an efficient process for the tinting of plastic articles.

Another object of the present invention is to provide a process yielding uniformly tinted articles.

DETAILED DESCRIPTION OF THE INVENTION

The inventive process entails applying by spraying or by flow coating a hot, dye-solution onto at least a portion of the surface of a molded article to obtain a tinted article and washing the tinted article. In addition to the dissolved dye, the dye solution that is substantially free of particulate matter contains an aqueous solution of an organic solvent and an optional emulsifier. The article is one molded of a thermoplastic molding composition. In an embodiment of the invention, the dye solution is prepared by filtering a hot aqueous solution through a bag filter that contains a dye to obtain a hot, dye-solution. In a further embodiment, activated carbon is used to purify the dye solution to obtain a dye-free, aqueous solution.

The application of the dye solution to the molded article is by spraying or by flow coating. In either process, the solution is applied to the article so that the article is contacted by the dye solution for the length of time sufficient to attain the desired tint. The term "spraying" in the present context means "applying the dye solution to the article in the form of droplets, fog or mist". The term "flow coating" as used in the present context means "applying the dye solution to the article in the form of liquid film".

The articles to be tinted (in the present context, the terms "tinted", "colored" and "dyed" are used interchangeably), in accordance with the inventive process, may be molded of either thermoplastic or thermosetting compositions. Among the compositions thus suitable mention may be made of compositions that contain one or more of the following: (co)polyesters, (co)polycarbonates (including aromatic and aliphatic polycarbonate, such as, allyldiglycol carbonate e.g., trade name CR-39), polyesterpolycarbonate copolymers, styrenic copolymers, such as, SAN and acrylonitrile-butadiene-styrene (ABS), acrylic polymers such as polymethylmethacrylate and ASA, polyamide, and polyurethane.

Particularly suitable compositions include one or more resins selected from the group consisting of polyester, polycarbonate, polyesterpolycarbonate copolymer, acrylonitrile-butadiene-styrene (ABS), polyamide, polyurethane, polymethylmethacrylate and styrene (co)polymer. Particularly suitable are compositions that contain polycarbonate, and most particularly thermoplastic aromatic polycarbonates.

The suitable molding compositions may include any of the additives that are known in the art for their function in these compositions and may include one or more of: mold release agents; fillers; reinforcing agents in the form of fibers or flakes, most notably, metal flakes, such as, aluminum flakes, flame retardant agents, pigments and opacifying agents, such as, titanium dioxide and the like; light-diffusing agents, such as, polytetrafluoroethylene, zinc oxide, Paraloid EXL-5136 available from Rohm and Haas and crosslinked polymethylmethacrylate minispheres (such as n-licrospheres from Nagase America) UV-stabilizers, hydrolytic stabilizers and thermal stabilizers.

Articles to be dyed, in accordance with the inventive process, are molded conventionally by methods that have long been practiced in the plastics arts and include compression molding, injection molding, rotational molding, extrusion, injection and extrusion blow molding, and casting, the method of molding the articles is not critical to the practice of the inventive process.

The dye solution contains a dye and an aqueous solution. The aqueous solution contains:

(a) water in an amount of 60 to 70 pbw (percent by weight relative to the weight of the aqueous solution)

(b) a carrier in an amount of 15 to 25 pbw and optionally, (c) a an emulsifier in an amount of up to 15 pbw.

The carrier suitable in the context of the invention conforms structurally to $R^1 [\text{—O—}(CH_2)_n]_m OR^2$ wherein $R^2$ and $R^1$ independently of the other denotes H, $C_{1-18}$ alkyl, benzyl, benzoyl or phenyl radical which may be substituted in the aromatic ring by alkyl and or halogen, n is 2 or 3 and m is 1 to 35, preferably 1 to 12, most preferably 1. Most preferably $R^2$ denotes butyl and $R^1$ denotes H.

The emulsifier suitable in the context of the invention is a substance that holds two or more immiscible liquids or solids in suspension (e.g., water and the carrier). Proper emulsification is essential to the satisfactory performance of a carrier. An emulsified carrier readily disperses when poured into water.

Emulsifiers which may be used include ionic, non-ionic, or mixtures thereof. Typical ionic emulsifiers are anionic, including amine salts or alkali salts of carboxylic, sulfamic or phosphoric acids, for example, sodium lauryl sulfate, ammonium lauryl sulfate, lignosulfonic acid salts, ethylene diamine tetra acetic acid (EDTA) sodium salts and acid salts of amines, such as, laurylamine hydrochloride or poly(oxy-1,2-ethanediyl), alpha.-sulfo-omega-hydroxy ether with phenol 1-(methylphenyl)ethyl derivative ammonium salts; or amphoteric, that is, compounds bearing both anionic and cationic groups, for example, lauryl sulfobetaine; dihydroxy ethylalkyl betaine; amido betaine based on coconut acids; disodium N-lauryl amino propionate; or the sodium salts of dicarboxylic acid coconut derivatives. Typical non-ionic emulsifiers include ethoxylated or propoxylated alkyl or aryl phenolic compounds, such as, octylphenoxypolyethyl-eneoxyethanol or poly(oxy-1,2-ethanediyl), alpha-phenyl-omega-hydroxy, styrenated. The preferred emulsifier is diethylene glycol.

Emulsifiers, such as disclosed in "Lens Prep II", a commercial product of Brain Power International (BPI) are also useful for practicing the present invention. LEVEGAL DLP a product of Bayer Polymers LLC is a pre-formulated mixture of a suitable carrier (polyglycol ether) with emulsifiers that are useful together with a dye and water for preparing a dyeing bath suitable for molded parts, preferably polycarbonate parts.

The optional emulsifier may be used in an amount of 0 to 15 pbw, preferably 7 to 15 pbw, most preferably, 10 to 15 pbw.

The dyes to be used in accordance with the invention are conventional and include fabric dyes and disperse dyes as well as dyes that are known in the art as suitable for tinting of polycarbonates. Examples of suitable disperse dyes include Disperse Blue #3, Disperse Blue #14, Disperse Yellow #3, Disperse Red #13 and Disperse Red #17. The classification and designation of the dyes recited in this specification are in accordance with "The Colour Index", 3rd Edition published jointly by the Society of Dyes and Colors and the American Association of Textile Chemists and Colorists (1971), incorporated herein by reference. Dyestuffs can generally be used either as a sole dye constituent or as a component of a dye mixture depending upon the color desired. Thus, the term "dye" as used herein includes "dye mixture".

The dye class known as "Solvent Dyes" is useful in the practice of the present invention. This dye class includes the preferred dyes Solvent Blue 35, Solvent Green 3 and Acridine Orange Base. However, Solvent Dyes, in general, do not color as intensely as do Disperse Dyes.

Among the suitable dyes, special mention is made of water-insoluble azo, diphenylamine and anthraquinone compounds. Especially suitable are acetate dyes, dispersed acetate dyes, dispersion dyes and dispersol dyes such as are disclosed in *Colour Index*, $3^{rd}$ Edition, Vol. 2, The Society of Dyers and Colourists, 1971, pp. 2479 and pp. 2187-2743, respectively, all incorporated herein by reference. The preferred dispersed dyes include Dystar's Palanil Blue E-R150 (anthraquinone/Disperse Blue) and DIANIX Orange E-3RN (azo dye/CI Disperse Orange 25). Note that phenol red and 4-phenylazophenol do not dye polycarbonate in accordance with the inventive process.

The dyes known as "direct dyes" and the ones termed "acid dyes" are not suitable in the practice of the invention for polycarbonate. However, acid dyes are effective with nylon. Also noteworthy are reactive dyes sold under the trade name Reactint for use with polyurethanes and polyurethane blends.

The amount of dye used in the mixture can vary; however, only small amounts are typically needed to sufficiently tint an article in accordance with the invention. A typical dye concentration in the bath is 0.4 pbw, but there is considerable latitude in this regard. Generally, dyes may be present in the solvent mixture at a level of about 0.1 to 15 pbw, preferably 0.3 to 0.5 pbw.

Experience has shown that the presence in the dye solution of particulate matter is highly undesirable. Such particulates, including for instance un-dissolved clumps of dye powder tend to adhere to the surface of the article to be tinted and/or clog the equipment used in applying the dye solution. Consequently, successful practice of the inventive process entails a dye solution that is virtually free of, preferably includes no, particulate matter.

The application of the dye solution to the article in accordance with the inventive process is required to be in the form of a hot solution, that is to say that the solution needs to be at a temperature that is less than the boiling temperature of water and preferably 50 to 98° C. The optimal operating temperature depends on the composition of the article to be dyed and may be determined by routine testing. Experience shows that for articles molded of polycarbonate, the best temperature is 90 to 98° C.; whereas, for articles molded of polyurethane the better results are obtained where the temperature is 60 to 70° C.

In an embodiment of the inventive process, the dye solution is contained in one compartment and the article to be tinted is positioned in another compartment of the same vessel or in a different vessel. The dye solution is pumped through suitable dispensers, such as atomizing nozzles or manifolds positioned in the vessel that contain the article. The dye solution is then applied to the article in a manner calculated to expose all the surfaces of the articles to the dye solution.

In a variation of the above, the first compartment of said vessel is sized to contain a large article (e.g., polycarbonate sheet) and is equipped with a plurality of nozzles or dispensers that are positioned so as to enable contact between the dye solution and the article at a sufficient temperature and with sufficient time calculated to tint the article uniformly. These dispensers may be a series of atomizing nozzles that create a fine mist that covers the surface of the article to be tinted, or alternatively, a manifold that will direct the flow of hot dye solution over the surface of the article. The advantage of the inventive process over tinting by dipping in a dye bath is the great reduction, often by a factor of 10, of the quantity of solvent needed to tint large articles. The limited quantity of solution makes it possible to also reduce the size of the ancillary equipment, such as a pump and solution heater. In addition, the use of nozzles, or alternatively a manifold, directs the hot dye solution directly onto the surface of the article. Hence, the ability to supply fresh solvent saturated with dye to the surface of the article is not dependent on the strong agitation of the dye solution so necessary to achieve uniformity of dyeing in the dipping process. Note, that during this process, the article to be tinted is at no time dipped in the hot dye solution.

Excess dye solution that drips from the article is collected at the bottom of the first compartment containing the article being dyed and is transferred back to the second compartment where the solution is brought back to the starting temperature and recycled. The recycling process is continued until the article receives the desirable tint.

This process may also be designed so that after the article has been tinted, the equipment (e.g., atomizing nozzles) is used to deliver a high pressure water spray to remove excess dye solution from the tinted article. In addition, hot air blowers or a water vacuum may be installed in the compartment containing the tinted article for purpose of drying.

In the course of using the inventive process, it is sometimes desired to change the compositional makeup of the bath, such as for making it useable for a different tint. In these instances, it was found to be more economical and environmentally desirable to re-use the solvent. The purification of the inventive dye solution to obtain a clean, dye-free solvent was found to be readily attainable by passing the solution through activated carbon. The activated carbon may be used as a column or a bed or any other configuration that will allow the passage of the dye solution resulting in a dye-free solvent. While activated carbon has long been used for separating out the organic components from a solution, it was not at all predictable that the present dye solution that contains more than one organic component could be thus purified. Experiments have shown the surprising efficacy of activated carbon in purifying the organic solution of the inventive process thus enabling re-use of the organic solvent.

The molded articles may be any of a vast variety of useful items and include computer face-plates, keyboards, bezels and cellular phones, color coded packaging and containers of all types, including ones for industrial components, residential and commercial lighting fixtures and components therefor, such as sheets, used in building and in construction, tableware, including plates, cups and eating utensils, small appliances and their components, optical and sun-wear lenses, as well as decorative films including such films that are intended for use in film insert molding.

The invention is further illustrated but is not intended to be limited by the following examples in which all parts and percentages are by weight unless otherwise specified.

EXAMPLES

A 40-L circular vessel was fitted with piping and a pump to transfer heated solution from the bottom of the vessel through an external loop equipped with a bag filter and back into the vessel through distribution rings. The rings function as a means to circulate the liquid thoroughly throughout the tank and eliminate any circulatory "dead spots" that might occur. These rings consisted of 3 sections of stainless tubing curved to fit the internal contour of the circular vessel and connected to the outlet of the external loop. Small holes were drilled in the rings at regular intervals about 3 inches apart. The rings were positioned respectively at the bottom, middle and near the top of the vessel and direct the flow of the liquid towards the center of the tank to provide brisk circulation of the dye solution. Makrolex Blue 3R dye (33 g) was added to a 5 micron nylon filter bag and the bag was placed into the bag filter. Water (15.4-L), butyl cellosolve (4.4-L) and diethylene glycol (2.2-L) were charged into the vessel and the solution heated to 95° C. while circulating through the external loop. Clear, 4 inch diameter, 0.157 inch thick disks, injection molded from polycarbonate resin (Makrolon 2600), were then immersed in the mix for 5 minutes, withdrawn, rinsed with water and dried with a soft, white towel (WYPall from Kimberly Clark). Visual inspection of the part on a light table revealed any mottled appearing areas (i.e., areas with different color densities).

In a second experiment, the circular vessel described above was replaced with a rectangular-shaped vessel 6 inches wide×8 inches long×6 inches deep. Solution circulation was provided by a ⅜ inch stainless steel tube containing 1/16 inch diameter holes, running along the 8 inch length of the tank and positioned 3 inches from the tank bottom. The holes in the stainless steel tube were placed at ½ inch intervals along the tube. In contrast to the 40-L vessel, the rectangular vessel was charged with 1-gallon of dye solution composed of water, butylcellosolve and diethylene glycol in the ratios given above.

In a similar experiment, a 55 gallon stainless steel drum was fitted with three external manifolds running around the exterior circumference of the drum. Outlets from each manifold were welded to the drum at 6 inch, 12 inch and 18 inch intervals from the top of the drum and at every 45 degrees angle as measured from the center of the drum, making a total of 24 outlets, all aligned one above the other. Removable spray nozzles may be attached to these outlets wherever desired. Outlets not used with spray nozzles were blocked with plugs. The inlet of the manifold was fitted to a bag filter and pump arrangement as describe above for the 40-L vessel so that dye solution could be pumped through the manifold and nozzles into the drum. Inside the drum, dye solution exiting the nozzles was atomized to a fine mist. The mist was directed to the surface of a suspended article. Approximately 5 gallons of water, butyl cellosolve and diethylene glycol solution in the rations described above were added to the bottom of the drum. The Makcrolex dye was placed into the bag and sealed inside the bag filter housing as previously described. The solvents were heated to 95° C. while being pumped through the bag filter. Clear, 4 inch diameter disks, 0.157 inch thick and injection molded from polycarbonate resin (Makrolon 2600), were then suspended in the drum and sprayed with the hot dye solvent mist for 5 minutes. The disk was withdrawn, rinsed with water and dried with a soft, white towel. Again, visual inspection of the part on a light table revealed any mottled appearing areas (i.e., areas with different color densities). This experiment was repeated using as samples polycarbonate sheet and film.

Close control of the temperature of the vessel and sample was thought to be critical and dipping of the article in the hot dye solution was believed necessary for efficient tinting. The experiments proved that the application of the dye solution by the process of the invention results in successful tinting.

Moreover, it was expected that uniformity of tinting would not be attained by applying the solution through a plurality of nozzles since each of the nozzles targets the applied solution to a limited area and a degree of overlap of the several areas would be expected. This, it was believed would result in darker tinting at the areas of overlap. Similarly, drips and runs were also thought to create the opportunity for areas of darker tinting. The uniform tinting resulting upon the inventive process belied these expectations and beliefs.

TABLE 1

Polycarbonate Articles Treated Using Dipping and Spray Processes.

| Sample # | Article | Vessel Type | Process | Sample Appearance Mottled[1] Yes/No |
|---|---|---|---|---|
| 1 | 4-inch disk | Round | Dipping | No |
| 2 | Safety glasses | Round | Dipping | No |
| 3 | Plaques | Round | Dipping | No |
| 4 | 4-inch disk | Rectangular | Dipping | Yes |
| 5 | Safety glasses | Rectangular | Dipping | Yes |
| 6 | Plaques | Rectangular | Dipping | Yes |
| 7 | 4-inch disk | n/a | Spray | No |
| 8 | Safety Glasses | n/a | Spray | No |
| 9 | Plaques | n/a | Spray | No |
| 10 | PC sheet | n/a | Spray | No |
| 11 | PC film | n/a | Spray | No |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for tinting a molded article comprising applying by spraying or by flow coating a mixture to at least a portion of the surface of a molded article to obtain a tinted article and washing the tinted article, said mixture containing a dye and
   (a) water in an amount of 60 to 70 pbw (percent by weight relative to the weight of the mixture)
   (b) a carrier in an amount of 15 to 25 pbw and optionally
   (c) an emulsifier in an amount of up to 15 pbw, said carrier conforming structurally to $R^1[-O-(CH_2)_n]_m OR^2$ wherein $R^2$ and $R^1$ independently one of the other denotes H, $C_{1-18}$ alkyl, benzyl, benzoyl or phenyl radical which may be substituted in the aromatic ring by alkyl and/or halogen, n is 2 or 3 and m is 1 to 35, said article having been molded of a resinous molding composition, said mixture being at 50 to 98° C. and substantially free of particulate matter.

2. The process of claim 1 wherein the resinous molding composition is thermoplastic.

3. The process of claim 1 wherein the resinous molding composition is thermosetting.

4. The process of claim 2 wherein the thermoplastic contains at least one member selected from the group consisting of (co)polyester, (co)polycarbonate, (co)polyestercarbonate, styrenic (co)polystyrene, (co)polyacrylate, (co)polyamide, and (co)polyurethane.

5. The process of claim 4 wherein the thermoplastic contains at least one member selected from the group consisting polyester, polycarbonate, polyesterpolycarbonate copolymer, acrylonitrile-butadiene-styrene (ABS), polyamide, polyurethane, polymethylmethacrylate and styrene (co)polymer.

6. The process of claim 4 wherein the thermoplastic is polycarbonate.

7. The process of claim 1 wherein $R^2$ denotes butyl and $R^1$ denotes H.

8. The process of claim 1 wherein the mixture is prepared by filtering through a bag filter that contains a dye.

9. A process for tinting a molded article comprising applying by spraying or by flow coating a mixture to at least a portion of the surface of a molded article to obtain a tinted article, collecting the spent mixture and washing the tinted article, said mixture containing a dye and an aqueous solution of a carrier and an optional emulsifier, said article having been molded of a resinous molding composition, said mixture being at 50 to 98° C. and substantially free of particulate matter and passing the spent mixture through activated carbon under conditions calculated to separate the dye therefrom.

10. A process for tinting a molded article comprising applying by spraying a mixture to at least a portion of the surface of a molded article to obtain a tinted article and washing the tinted article, said mixture containing a dye and
  (a) water in an amount of 60 to 70 pbw (percent by weight relative to the weight of the mixture)
  (b) a carrier in an amount of 15 to 25 pbw and optionally
  (c) an emulsifier in an amount of up to 15 pbw, said carrier conforming structurally to $R^1[-O-(CH_2)_n]_m OR^2$ wherein $R^2$ and $R^1$ independently one of the other denotes H, $C_{1-18}$ alkyl, benzyl, benzoyl or phenyl radical which may be substituted in the aromatic ring by alkyl and/or halogen, n is 2 or 3 and m is 1 to 35, said article having been molded of a resinous molding composition, said mixture being at 50 to 98° C. and substantially free of particulate matter.

11. A process for tinting a molded article comprising applying by flow coating a mixture to at least a portion of the surface of a molded article to obtain a tinted article and washing the tinted article, said mixture containing a dye and
  (a) water in an amount of 60 to 70 pbw (percent by weight relative to the weight of the mixture)
  (b) a carrier in an amount of 15 to 25 pbw and optionally
  (c) an emulsifier in an amount of up to 15 pbw, said carrier conforming structurally to $R^1[-O-(CH_2)_n]_m OR^2$ wherein $R^2$ and $R^1$ independently one of the other denotes H, $C^{1-18}$ alkyl, benzyl, benzoyl or phenyl radical which may be substituted in the aromatic ring by alkyl and/or halogen, n is 2 or 3 and m is 1 to 35, said article having been molded of a resinous molding composition, said mixture being at 50 to 98° C. and substantially free of particulate matter.

* * * * *